United States Patent [19]

Moses

[11] Patent Number: 5,404,377
[45] Date of Patent: Apr. 4, 1995

US005404377A

[54] SIMULTANEOUS TRANSMISSION OF DATA AND AUDIO SIGNALS BY MEANS OF PERCEPTUAL CODING

[76] Inventor: Donald W. Moses, 1590 Murphy Pkwy., Eagan, Minn. 55122-1753

[21] Appl. No.: 224,906

[22] Filed: Apr. 8, 1994

[51] Int. Cl.$^6$ ............................................. H04K 1/00
[52] U.S. Cl. .................... 375/200; 395/2.11; 395/2.41; 380/34
[58] Field of Search ............................ 375/1; 380/34; 395/2.11, 2.12, 2.41

[56] References Cited

U.S. PATENT DOCUMENTS

| | | | |
|---|---|---|---|
| 4,313,197 | 1/1982 | Maxemchuk | 375/1 X |
| 4,885,757 | 12/1989 | Provence | 395/2.11 X |
| 5,285,498 | 2/1994 | Johnston | 395/2.11 |
| 5,335,312 | 8/1994 | Mekata et al. | 395/2.11 |

FOREIGN PATENT DOCUMENTS

| | | | |
|---|---|---|---|
| 2220824 | 1/1990 | United Kingdom | 375/1 |
| 8505745 | 12/1985 | WIPO | 375/1 |
| 9011658 | 10/1990 | WIPO | 375/1 |

OTHER PUBLICATIONS

PCT International Patent Application No. PCT/US93/11090, Nov. 16, 1993 (International Filing Date), Nov. 16, 1992 (Priority Date), The Arbriton Company.

*Primary Examiner*—Tod R. Swann
*Attorney, Agent, or Firm*—Warren B. Kice; David L. McCombs; Brandi W. Sarfatis

[57] ABSTRACT

A communication system for simultaneously transmitting data and audio signals via a conventional audio communications channel using perceptual coding techniques is disclosed. In a preferred embodiment, a first artificial neural network (NN) at an encoder monitors an audio channel to detect "opportunities" to insert the data signal such that the inserted signals are masked by the audio signal, as defined by the "perceptual entropy envelope" of the audio signal. Under the control of the first NN a data signal containing, for example, an ID or serial number, is encoded as one or more whitened direct sequence spread spectrum signals and/or a narrowband FSK data signal and transmitted at the time, frequency and level determined by the first NN such that the data signal is masked by the audio signal. The audio signal is combined with the spread spectrum and/or the FSK data signal(s) to form a composite signal, which is transmitted to one or more receiving locations via the audio channel. A decoder at each of the receiving locations comprises preprocessing circuitry, receiver sync circuitry and FSK decoder circuitry, as well as a second NN, which NN uses pattern and signature recognition techniques to perform block decoding, bit deinterleaving and acquisition confirm functions to recover the encoded ID or serial number.

59 Claims, 4 Drawing Sheets

SIMULTANEOUS TRANSMISSION OF DATA AND AUDIO SIGNALS BY MEANS OF PERCEPTUAL CODING

TECHNICAL FIELD

The invention relates generally to data communications systems and, more specifically, to a system for enabling the simultaneous transmission of data and audio signals using perceptual coding techniques.

BACKGROUND OF THE INVENTION

It is often desirable to transmit low to medium speed data signals over audio channels, such as telephone, radio and television channels, carrying analog voice and/or music signals. Such data signals may be used to convey, for example, a serial number, the name of a song being played, copyright information, royalty billing codes, virtual reality cues and codes identifying particular television or radio stations for polling viewers and listeners. A popular technique for accomplishing such simultaneous transmission involves the transmission of a data signal in the underutilized portions of the frequency spectrum below and/or above the voice band available on a telephone line, such that the data signal is imperceptible to listeners. Spread spectrum whitening techniques are applied to the data signal to maintain interference at a low level.

An example of a technique that places the information in the lower frequency region of the voice band is disclosed in U.S. Pat. No. 4,425,661 to Moses et al. Another technique, described in U.S. Pat. No. 4,672,605 to Hustig et al., involves the use of a spread spectrum signal having most of its energy in the higher audio frequency region and above the voice band. Yet another technique, described in U.S. Pat. No. 4,425,642 to Moses et al., involves spread spectrum processing a data signal throughout the channel spectrum, such that the spectral energy of the data signal possesses a pseudo random noise characteristic which, when added to the voice channel, causes only an imperceptible increase in white noise.

Although systems such as those described above are typically sufficient for the particular purposes for which they were designed, they suffer certain deficiencies inherent to the use of spread spectrum processing. Specifically, the use of spread spectrum whitening techniques alone results in extremely low data throughput rates on an audio channel, due to the large spreading gain that must be achieved. In addition, although such techniques make limited use of certain "masking" characteristics of the audio signal with which the data signal is to be transmitted, they do not make full use of such characteristics, as further described below, thereby limiting the processing gain which might otherwise be achieved.

Other techniques for enabling the simultaneous transmission of audio and data signals in a single channel include using a start pulse created by taking a subband to zero energy level, then using the following short period of digitized audio as the serial number and using subbands to carry a digital message by forcing the subband energy to zero or leaving it at the actual level in order to create "marks" and "spaces" (i.e., "ones" and "zeros"). The primary deficiencies of the former technique include poor noise immunity and the fact that it is not practical in situations in which many bytes of data must be stored and processed. The primary deficiencies of the latter technique also include poor noise immunity, as well as an extremely slow data throughput rate.

It is known in the art that every audio signal generates a perceptual concealment function which masks audio distortions existing simultaneously with the signal. Accordingly, any distortion, or noise, introduced into the transmission channel if properly distributed or shaped, will be masked by the audio signal itself. Such masking may be partial or complete, leading either to increased quality compared to a system without noise shaping, or to near-perfect signal quality that is equivalent to a signal without noise. In either case, such "masking" occurs as a result of the inability of the human perceptual mechanism to distinguish between two signal components, one belonging to the audio signal and the other belonging to the noise, in the same spectral, temporal or spatial locality. An important effect of this limitation is that the perceptibility of the noise by a listener can be zero, even if the signal-to-noise ratio is at a measurable level. Ideally, the noise level at all points in the audio signal space is exactly at the level of just-noticeable distortion, which limit is typically referred to as the "perceptual entropy envelope."

Hence, the main goal of noise shaping is to minimize the perceptibility of distortions by advantageously shaping it in time or frequency so that as many of its components as possible are masked by the audio signal itself. See Nikil Jayant et al., *Signal Compression Based on Models of Human Perception*, 81 Proc. of the IEEE 1385 (1993). A schematic representation of time-frequency domain masking is shown in FIGS. 1a–1c, in which a short sinusoidal tone 10 produces a masking threshold 12. See John G. Beerends and Jan A. Stemerdink, *A Perceptual Audio Quality Measure Based on a Psychoacoustic Sound Representation*, 40 J. Audio Engineering Soc'y 963, 966 (1992).

"Perceptual coding" techniques employing the above-discussed principles are presently used in signal compression and are based on three types of masking: frequency domain, time domain and noise level. The basic principle of frequency domain masking is that when certain strong signals are present in the audio band, other lower level signals, close in frequency to the stronger signals, are masked and not perceived by a listener. Time domain masking is based on the fact that certain types of noise and tones are not perceptible immediately before and after a larger signal transient. Noise masking takes advantage of the fact that a relatively high broadband noise level is not perceptible if it occurs simultaneously with various types of stronger signals.

Perceptual coding forms the basis for precision audio sub-band coding (PASC), as well as other coding techniques used in compressing audio signals for mini-disc (MD) and digital compact cassette (DCC) formats. Specifically, such compression algorithms take advantage of the fact that certain signals in an audio channel will be masked by other stronger signals to remove those masked signals in order to be able to compress the remaining signal into a lower bit-rate channel.

Another deficiency of the prior art techniques for simultaneously transmitting data signals with audio signals is that if the signals are transmitted through a channel which implements a lossy compression algorithm, such as the MPEG compression algorithm, the data signal, or at least portions thereof, will likely be removed, as most such compression algorithms divide the audio channel into a plurality of subbands and then encode and transmit only the strongest signal within each subband. Regardless of which of the previously-described techniques is used, it is highly unlikely that the data signal will ever be the strongest signal in a subband; therefore, it is unlikely that any portion of the data signal will be transmitted. Moreover, with respect to the spread spectrum techniques, even assuming the data signal happens to be the strongest signal in one or two subbands, because the information is spread throughout the signal spectrum, the information contained in such subbands will comprise only a small portion of the total information carried by the data signal and therefore is likely to be useless.

Accordingly, what is needed is a system for simultaneously transmitting data and audio signals that utilizes the advantages of perceptual coding techniques and which is capable of transmitting data signals through a lossy compressed channel.

SUMMARY OF THE INVENTION

The foregoing problems are solved and a technical advance is achieved by a communication system for simultaneously transmitting data and audio signals via a conventional audio communications channel using perceptual coding techniques. In a departure from the art, a multilayer, artificial neural network (first NN) at an encoder monitors an audio signal to detect "opportunities" to insert the data signal such that the inserted signals are masked by the audio signal, as defined by the "perceptual entropy envelope" of the audio signal. The output of the first NN controls a clock circuit for controlling the transmission frequency or frequencies of the data signal, a signal level control circuit for controlling the level at which the data signal is transmitted, and a burst timing circuit for controlling the timing of transmission of the data signal. Under the control of the first NN, one or more whitened direct sequence spread spectrum and/or a narrowband FSK data signal is combined with the audio signal at the time, frequency and level determined by the first NN such that the data signal is masked by the audio signal.

In a preferred embodiment, a data signal containing, for example, a number for identifying a particular television network, is generated by a conventional computer and input to an encoder of the communications system of the present invention via an RS-232C interface. The data signal is processed by a first preprocessing circuit, which processes the data signal using block encoding and bit interleaving techniques to ensure virtually error-free transmission of the data signal. The data signal is then input to three transmission encoders, including a wideband spread spectrum encoder for encoding and transmitting the data signal as a wideband direct sequence spread spectrum signal at processing gains and levels related to noise masking opportunities as determined by the first NN, a bandlimited spread spectrum encoder for generating and transmitting the data signal as a bandlimited direct sequence spread spectrum signal which is responsive to both noise and frequency masking opportunities as determined by the first NN, and an FSK burst encoder for generating and transmitting the data signal as a narrowband FSK modulated signal in either burst or continuous mode which is responsive to time-masking opportunities as determined by the first NN.

The levels of the signals output from the three transmission encoders are regulated by three variable attenuators, respectively, under the control of the first NN via the level control circuit. The three signals are then merged with the audio signal to form a composite signal, which is transmitted via an audio channel to one or more receiving locations or recorded on any appropriate recording medium to be transmitted when the audio signal recorded thereon is played back. Additionally, the composite signal is input to a verification circuit comprising a channel simulator, which emulates the noise, bandwidth, phase delay and other characteristics of the audio channel, and a receiver. A verification signal output from the receiver is fed back to the first NN, which uses the information contained therein to determine whether the signal can be accurately decoded to recover the data signal.

At one or more receiving locations, the composite signal is input to a decoder comprising a bandpass filter, the parameters of which are defined by the passband of the audio channel, and a preprocessing circuit, which adjusts the gain of the signal and converts it to a digital signal to facilitate decoding. The signal output from the preprocessing circuit is input to a receiver sync circuit, which performs sync acquisition of the data signal in quadrature phase using an iterative phase stepping procedure. Once sync acquisition has been accomplished and the phase of the data signal has been locked onto, a digital phase lock loop voltage controlled oscillator is used as a flywheel to retain phase sync between bursts of lock. Clock signals generated by the phase lock loop are input to a pseudo noise code generating circuit that produces a PN code, which is merged modulo-2 with the data signal for recovering the information (e.g., the ID number) contained in the wideband and/or bandlimited direct sequence spread spectrum signal(s) generated by the corresponding transmission encoder(s). The recovered information, which will typically comprise a fuzzy logic set, is then input to a back propagation perceptron-type neural network (second NN), which uses pattern and signature recognition techniques to perform block decoding, bit deinterleaving and acquisition confirm functions. The second NN outputs a signal indicative of the decoded ID number.

Detection and decoding of the FSK data signal is performed by a band pass filter and an FSK decoder. The output of the FSK decoder is input to the neural network and processed similarly as the spread spectrum signals.

A technical advantage achieved with the invention is the increased processing gain that can be attained by using a neural network to determine the perceptual entropy envelope of an audio channel and to control the timing, frequency and level of transmission of a data signal.

Another technical advantage achieved with the invention is the increase in the data transmission rate that can be achieved by transmitting the data signal in a "partial response" mode and using a neural network to implement pattern and signature recognition techniques to recover the data signal at the decoder.

A further technical advantage achieved with the invention is that the data signal may be encoded, using the FSK burst encoder, such that it is able to "punch through" most compression algorithms.

A further technical advantage achieved with the invention is that the most complex and expensive hardware is necessary only at the single location where the data is encoded, whereas relatively inexpensive hardware may be used at the one or more decoder locations.

DETAILED DESCRIPTION OF THE PREFERRED EMBODIMENT

Figure 1A:
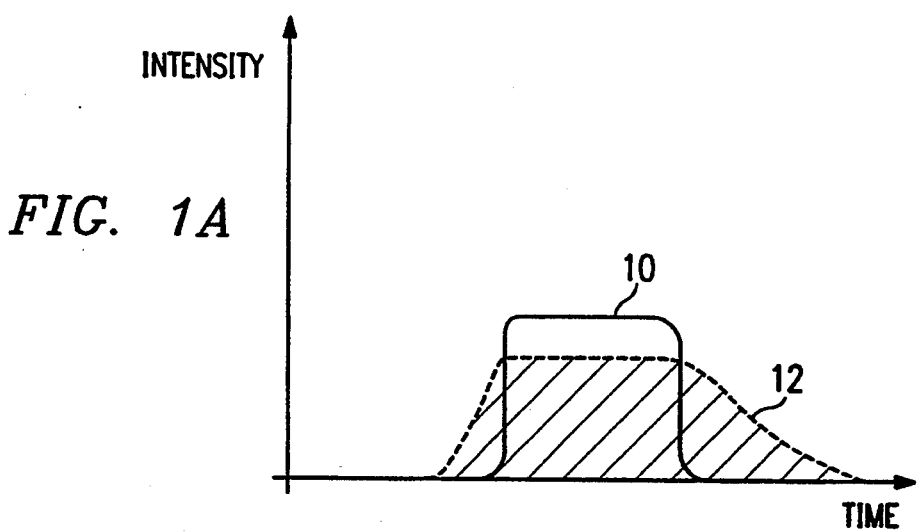
FIGS. 1a, 1b and 1c comprise a schematic representation of the time-frequency domain masking characteristics of a short sinusoidal tone.
Figure 1B:
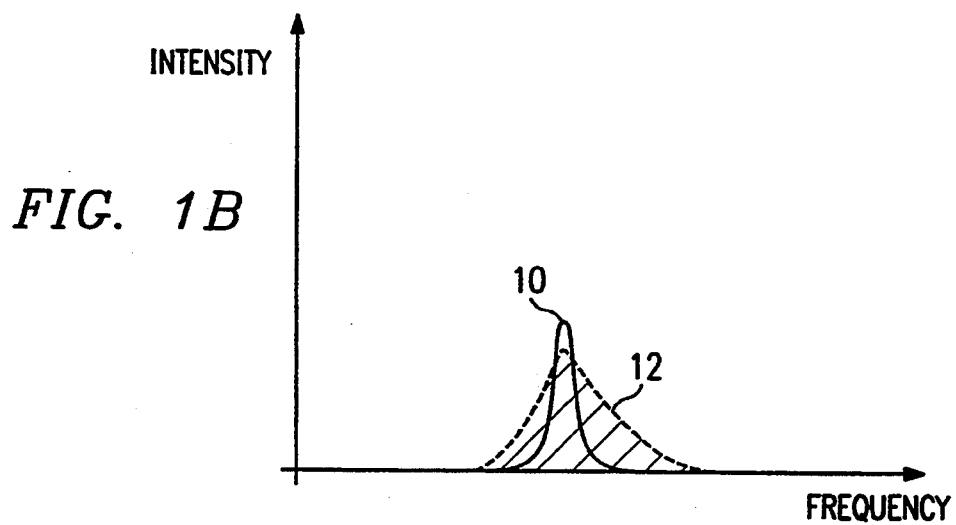
Figure 1C:
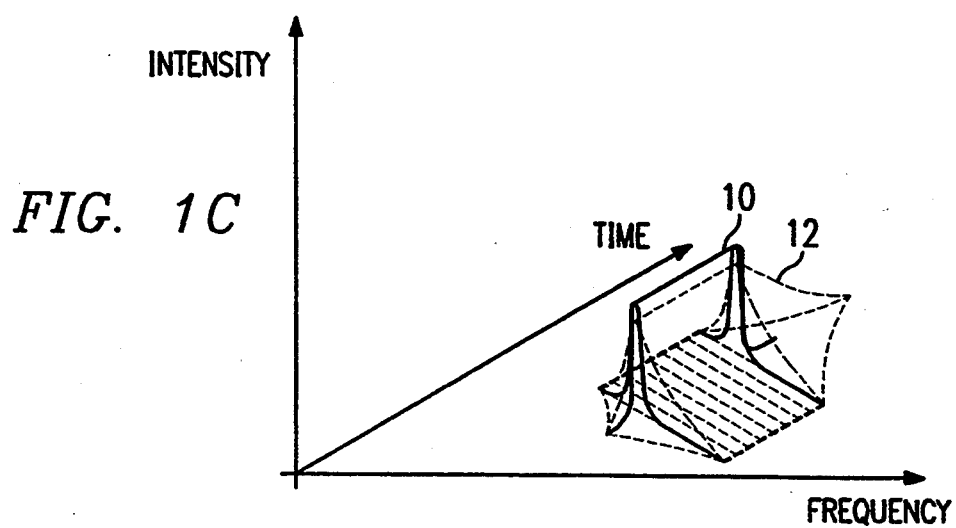

FIGS. 1a-1c illustrate a schematic representation of time-frequency domain masking of audio distortions in which a short sinusoidal tone 10 produces a masking threshold, or perceptual entropy envelope, 12.

Figure 2:
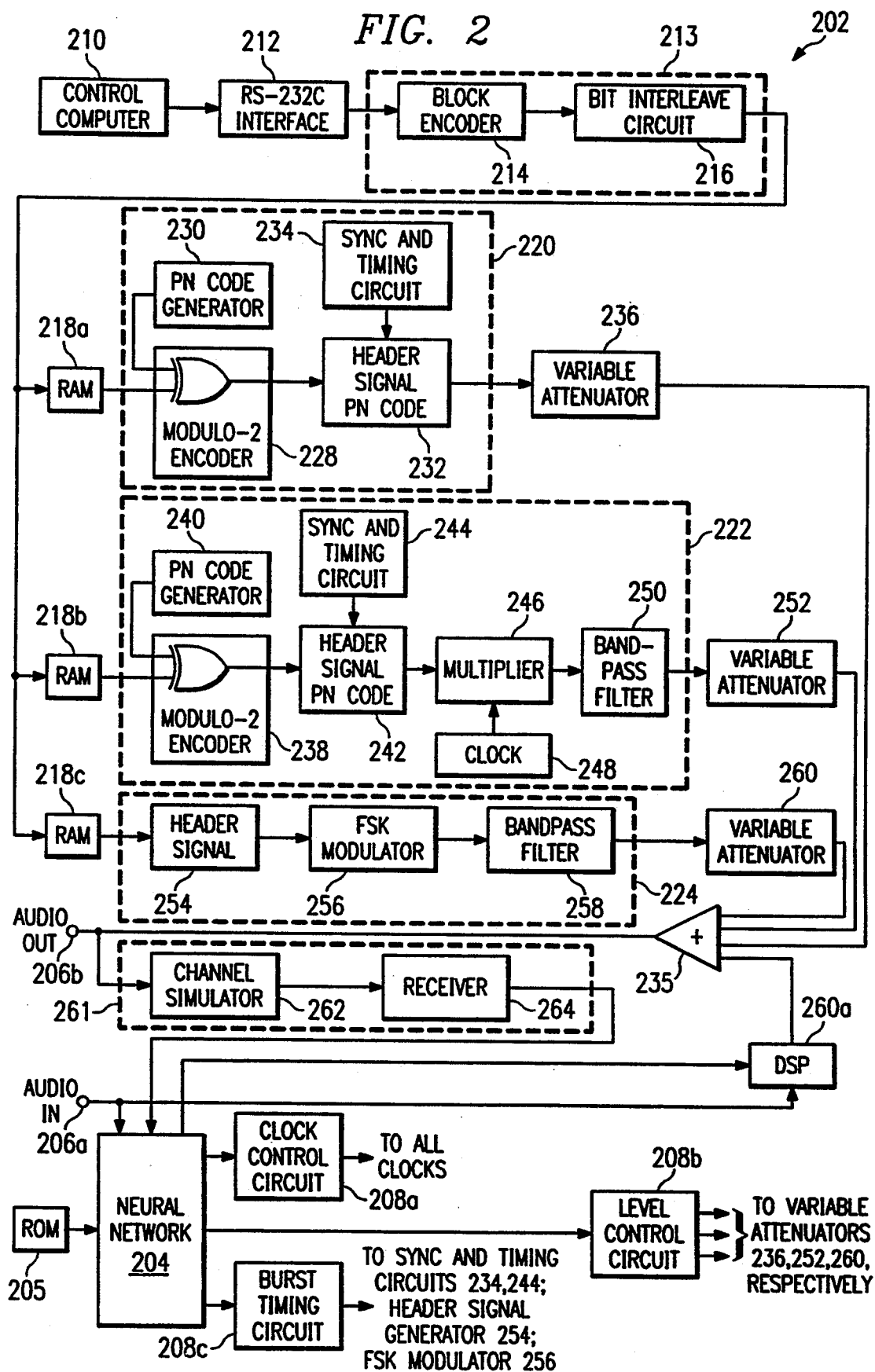
FIG. 2 is a schematic block diagram of an encoder embodying features of the present invention for encoding data to be transmitted simultaneously with audio signals using perceptual coding techniques.

FIG. 2 is a schematic block diagram of an encoder 202 embodying features of the present invention for encoding, using perceptual coding techniques, data to be transmitted simultaneously with audio signals via an audio channel (not shown), such as a television transmission channel. Perhaps most significantly, the encoder 202 includes a multilayer, artificial neural network (NN) 204, which monitors the audio signal, via an audio-in terminal 206a, for "opportunities" to insert data signals at times, frequencies and amplitudes such that they are not perceived by human ears. In other words, the NN 204 determines the "perceptual entropy envelope" of the audio channel, which, as previously described, is the three dimensional (time, frequency and amplitude) map of the optimal masking function of the audio channel. It should be understood by those skilled in the art that a neural network, such as the NN 204, comprises a combination of simple computational elements which are "trained" to perform specific mapping tasks between input and output data. As used herein, the term "neural network" also includes any necessary preprocessing circuitry, such as filters, timing circuits and others. The mapping function of a neural network is achieved after an initial lengthy training stage during which the NN 204 is supplied with input and output data which satisfy the mapping task. In the present embodiment, the input data supplied to the NN 204 comprises segments of audio signals and the required output is the auditory noise masking threshold (i.e., the perceptual entropy envelope) created by the audio signal segments. In this manner, the NN 204 is "trained" to extract the perceptually significant features from the audio signal at the audio-in terminal 218a, which relate to the perceptual entropy envelope generated by successive frames of input data. The algorithm for implementing the mapping function of the NN 204 is stored in a ROM 205, which in a preferred embodiment comprises a socketed chip, to make future upgrades easy and practical.

For purposes which will subsequently be described in greater detail, the NN 204 controls a clock control circuit 208a, a level control circuit 208b, and a burst timing circuit 208c. As will also be described in detail, under the control of the NN 204, the data signal will be encoded as one or more whitened direct sequence spread spectrum signals and/or a narrowband FSK data signal to be combined with the audio signal a time, frequency and amplitude such that the data signal is masked by the audio signal.

A digital data signal comprising a serial number or other identification number is generated by a control computer 210 and input to the encoder 202, preferably via an RS232-C interface 212, although it should be understood that any number of different types of interfaces may be used. The number generated by the control computer 210 may be, for example, a number for identifying a television network or a local radio or television station or a number to be encoded on a compact disc (CD) for identifying a particular artist or song. The data signal output from the control computer 210 is input to a preprocessing circuit 213 comprising a block encoder 214 for encoding the data signal to enable the detection and correction of errors therein when it is received at a decoder (FIG. 3), and a bit interleave circuit 216 for enabling the encoded number to withstand error hits in the transmission path. An exemplary system and method for performing such block encoding and bit interleaving techniques is described in detail in U.S. Pat. No. 4,672,605 to Hustig et al., which is hereby incorporated by reference. The data signal output from the preprocessing circuit 213 is stored in each of three random access memories (RAMs) 218a, 218b and 218c for use by a wideband spread spectrum encoder 220, a bandlimited spread spectrum encoder 222 and an FSK burst encoder 224, respectively, for purposes which will be described.

Figure 3:
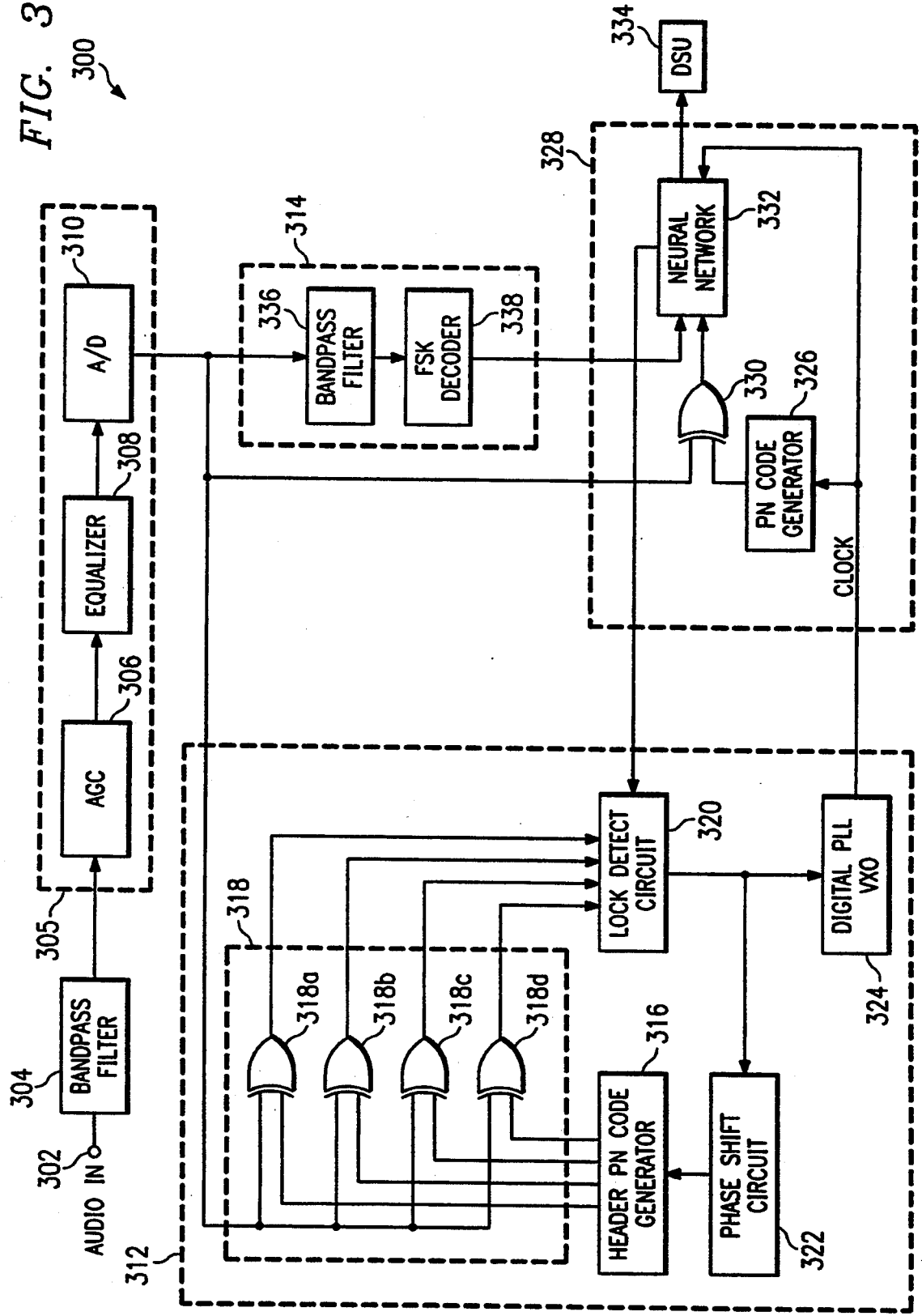
FIG. 3 is a schematic block diagram of a decoder embodying features of the present invention for decoding data signals encoded using the encoder of FIG. 2.

The wideband spread spectrum encoder 220 encodes the data signal as a wideband direct sequence spread spectrum signal at processing gains and levels related to noise masking opportunities in the audio signal as determined by the NN 204. Specifically, the NN 204 dynamically determines the noise masking perceptual entropy envelope for controlling the spread spectrum processing gain (i.e., ratio of data rate to pseudo-nose (PN) code frequency rate) and the signal level of the wideband pseudo-noise transmission output from the encoder 220. The data stored in the RAM 218a is input to a modulo-2 encoder 228, where it is merged with a synchronous PN code from a PN code generator 230 to form a direct sequence signal. In a preferred embodiment, the modulo-2 encoder 228 is implemented using an exclusive-OR (XOR) logic gate. The direct sequence signal output from the modulo-2 encoder 228 is input to a header signal generator 232, which adds a PN code header signal to each frame thereof, in accordance with synchronization and timing signals from a sync and timing circuit 234, in order to improve acquisition of the data signal at the decoder location(s) (FIG. 3). As shown in FIG. 2, the sync and timing circuit 234 is controlled by signals from the burst timing circuit 208c. The spectrum of the direct sequence signal output from the header signal generator 232 is relatively flat over the bandwidth of the channel, as is typical of direct sequence signals in general. Once the PN code header signal has been added to each frame of the data signal, the resultant wideband spread spectrum data signal is output to a summer 235 via a variable attenuator 236, which establishes the transmit level of the signal in accordance with control signals from the level control circuit 108b, which in turn is controlled by signals from the NN 204.

The bandlimited spread spectrum encoder 222 is similar to the wideband spread spectrum encoder 220, except that it encodes the data signal as a bandlimited, rather than a wideband, direct sequence spread spectrum signal responsive to both noise masking and frequency masking opportunities in the audio channel, as determined by the NN 204. As with the encoder 220, the data stored in the RAM 218b is input to a modulo-2 encoder 238 where it is merged with a PN code from a PN code generator 240 to form a direct sequence signal. The direct sequence signal output from the modulo-2 encoder 238 is input to a header signal generator 242, which adds a PN code header signal to each frame thereof in accordance with synchronization and timing signals from a sync and timing circuit 244. As shown in FIG. 2, the sync and timing circuit 244 is controlled by signals from the burst timing circuit 208c. As with the signal generated by the encoder 220, the spectrum of the direct sequence signal output from the header signal generator 242 is relatively flat over the bandwidth of the channel. Once the PN code header signal has been added to the direct sequence signal, the signal is output to a multiplier 246, where it is multiplied with a signal from a synchronous clock 248 having a high clock-to-PN code frequency. In this manner, the frequency of the signal may be raised to a selected frequency, which is preferably centered in a selected subband of the audio channel. The signal output from the multiplier 246 is then bandlimited by a bandpass filter 250, which translates the direct sequence signal energy into the selected subband. The resultant bandlimited spread spectrum data signal is output to the summer 235 via a variable attenuator 252, which, under the control of the level control circuit 208b, controls the amplitude at which the data signal is transmitted.

The FSK burst encoder 224 encodes the data signal as a narrowband signal which is related to time masking and frequency masking opportunities. The coded data stored in the RAM 218c is input to a header signal generator 254, which adds a header to each frame of data to facilitate acquisition of the data at the decoder location(s) (FIG. 3). The signal is then input to an FSK encoder 256, which FSK modulates the signal, and to a bandpass filter 258, which bandlimits the signal to concentrate the signal energy into a selected subband. As shown in FIG. 2, the header signal generator 254 and the FSK encoder are controlled by signals from the burst timing circuit 208c. The resultant FSK data signal is then output to the summer 235 via a variable attenuator 260, which, under the control of the level control circuit 208b, controls the amplitude at which the signal is transmitted. It should be understood that the FSK data signal output from the encoder 224 may be continuous, but dynamically varying in level, or may be in burst mode, triggered by a time masking opportunity, as determined by the NN 204. However, as will be described in detail, in a particular implementation in which the data signal must undergo lossy compression according to a known compression algorithm, such as MPEG, the signal must be transmitted in burst mode in order to survive such compression.

The wideband spread spectrum, bandlimited spread spectrum and FSK data signals output from the encoders 220-224, respectively, are combined by the summer 235 with the audio signal at the terminal 206a to form a composite signal, which is output to the audio channel at the terminal 206b. Alternatively, the composite signal may be recorded on any appropriate recording medium, such as a CD, in which case the signal will be transmitted when the CD is "played back." In a preferred embodiment, as illustrated in FIG. 2, before being input to the summer 235, the audio signal is input to a device, such as a digital signal processor (DSP) 260a, which, under the control of signals from the NN 204, functions to attenuate the level of the audio signal in certain subbands. Such attenuation might be necessary, for example, if the NN 204 signals an FSK burst or bandlimited spread spectrum signal transmission and then detects an unexpected burst of energy in the subband of the audio signal that would interfere with the data transmission. The composite signal is also input to a verification circuit 261 comprising a channel simulator 262, which adds noise to and degrades the composite signal slightly more than would be typical during transmission over the actual audio channel, and a typical receiver 264. The ability of the receiver 264 successfully to decode the data information contained in the composite signal is verified and a verification signal is transmitted to the NN 204.

It should be obvious that if perceptual coding techniques such as those described above are used to encode the data signal to be transmitted, then perceptual compression schemes, such as MPEG and PASC, will most likely remove the data from the composite signal before or during transmission. Therefore, to overcome this problem, the NN 204 must be trained not only to listen to the channel for opportunities at which the data signal may be transmitted imperceptibly, but also to compensate for the particular compression scheme to be encountered.

For example, one well-known and widely used compression scheme divides the audio band into thirty-two (32) subbands. Taking advantage of frequency domain masking, and to a certain extent, time domain masking, only the strongest signal in each subband is encoded and transmitted on the assumption that the remaining signals in the subband would not be heard anyway, as they would be masked by the stronger signal. In this case, in order to ensure that the data signal is transmitted, the NN 204 must be trained to "listen" for opportunities to transmit the data signal as an FSK burst signal where the data signal will be the strongest signal in a particular subband, with its transmission masked by following strong, broadband transients (time domain masking) in proximate subbands.

In such an embodiment, it would be possible, if not preferable, to preselect one or more subbands for transmitting the data signal(s). For example, a first subband may be selected for transmitting an ID code identifying the television network broadcasting the audio signal, another subband may be selected for transmitting an ID code identifying the distributor of the audio signal, and a third subband may be selected for transmitting an ID code identifying the local station transmitting the audio signal. In a preferred embodiment, in order to maximize speed and limit errors in data throughput to a certain level, the data transmission occurs in a "partial response" mode, meaning that the data signal is transmitted at a bit-rate faster than what would normally be considered optimum to ensure a clean decode at the decoder location(s) (FIG. 3), with the result being that the data received at the decoder location(s) comprises a "fuzzy logic" set. However, while transmission in a partial response mode is typically not optimum, it may be necessary to ensure that the data signal is transmitted quickly enough to fit into narrow subbands. As will be described, correction for errors resulting from partial response mode transmission is performed by a neural network (FIG. 3) at each decoder location, which is trained in pattern recognition to determine the identity of the data signals.

FIG. 3 is a schematic block diagram of a decoder 300 embodying features of the present invention for retrieving (i.e., decoding) data signals encoded using the encoder 202 and transmitted via the audio channel. The decoder 300 receives the composite signal transmitted via the audio channel (not shown) at an audio-in terminal 302. The received signal is input to a bandpass filter 304, the parameters of which are defined by the passband of the audio channel, for filtering out any unnecessary frequencies. The signal output from the filter 304 is input to a signal preprocessor 305 comprising an automatic gain controller (AGC) 306, which maintains the amplitude of the signal within an acceptable range, an equalizer 308, which compensates for known phase and amplitude distortions in the signal path, and an analog-to-digital (A/D) converter 310, which converts the signal to digital form to facilitate processing. The digital signal output from the preprocessor 305 is input to a receiver sync circuit 312 and to an FSK signal processing circuit 314.

The receiver sync circuit 312 performs sync acquisition of the wideband and/or bandlimited spread spectrum signals in quadrature phase using an iterative phase stepping procedure, as hereinafter described. A header PN code identical to that generated by the generators 232, 242 (FIG. 1) is generated by a header signal generator 316 and merged modulo-2 with the signal output from the preprocessor 305, in quadrature phase, in a wide dynamic range (i.e.. 18- to 24-bits of resolution) digital signal processor (DSP) 318. In the illustrated embodiment, the DSP 318 comprises four XOR gates 318a–318d. Four signals output from the DSP 318 are input to a lock detect circuit 320 for detecting when the phase of the data signal is locked with that of the header PN code from the generator 316. A signal indicative of whether a phase lock has been detected is input to a phase shift circuit 322 and a digital phase lock loop 324. So long as the signal output from the circuit 320 indicates that the phase of the signal has not been locked onto, the phase shift circuit continues to shift the phase until the circuit 320 detects a phase lock. It should be understood that typically, lock will occur in bursts, when the data transmitted is received with the highest quality. For this reason, the phase lock loop 324 operates as a flywheel, retaining clock phase sync between bursts of lock.

Clock signals generated by the phase lock loop 324 are fed to a PN code generator 326 of a decoder circuit 328. The PN code is merged modulo-2 with the signal output from the preprocessing circuit 305 by an XOR gate 330 to recover the data signal containing the ID number. The output of the XOR gate 330 will typically be a fuzzy logic set, because, as previously indicated, transmission of the data usually occurs in a partial response mode. The signal output from the XOR gate 330 is input to a neural network (NN) 332, which in a preferred embodiment comprises a "back propagation perceptron" that uses pattern and signature recognition techniques to perform block decoding, bit deinterleaving and acquisition confirm functions. As such pattern and signature recognition techniques and backpropagation perceptrons for implementing same are well known in the art they will not be further described.

Once acquisition of the data signal/ID number is confirmed by the NN 332, using pattern recognition, this fact is indicated to the lock detect circuit 320 as confirmation that the lock is valid. The decoded ID number is then output from the NN 332 after a relatively long delay, for example, ten seconds. Alternatively, the signal output from the NN 332 may simply indicate that the decoded number is the same as the previous number, that the decoded number is indeterminate, or that the decoded number is different than the previous number, in which case the new decoded number is output as described above. The ID numbers output from the NN 332 is held in a data storage unit (DSU) 334, the contents of which may be transferred at regular intervals by any appropriate means to a central processing unit (not shown), which processes the recovered ID numbers such that they may be used, for example, in performing radio and television surveys, as well as music royalty tracking applications, as described below.

Referring again to the FSK processing circuit 314, to decode data transmitted as an FSK burst signal, the signal output from the preprocessor 305 is input to a bandpass filter 336, similar to the filter 258, and then to an FSK decoder 338 for decoding the signal. Again, because data transmission occurs in a partial response environment, the output of the FSK decoder 338 will be a fuzzy logic set. The fuzzy logic signal output from the FSK decoder 338 is input to the NN 332, which processes the signal in the same manner as signals input thereto from the XOR gate 330.

Figure 4A:
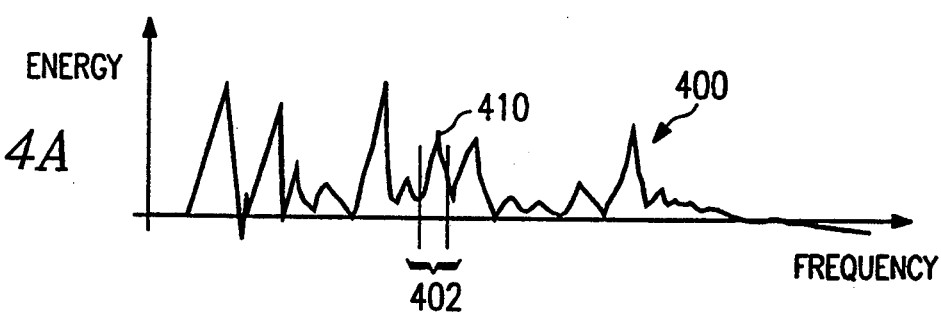
FIG. 4a illustrates the frequency spectrum of an exemplary audio signal for use with the system of the present invention.
Figure 4B:
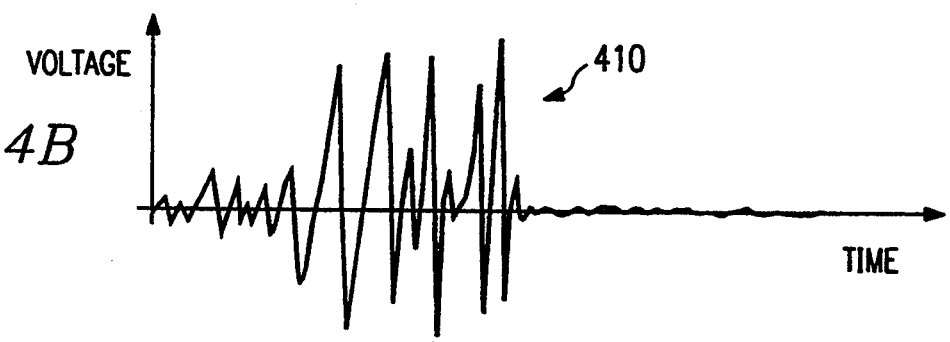
FIG. 4b is a timing diagram of the voltage of the audio signal of FIG. 4a within a selected subband.
Figure 4C:
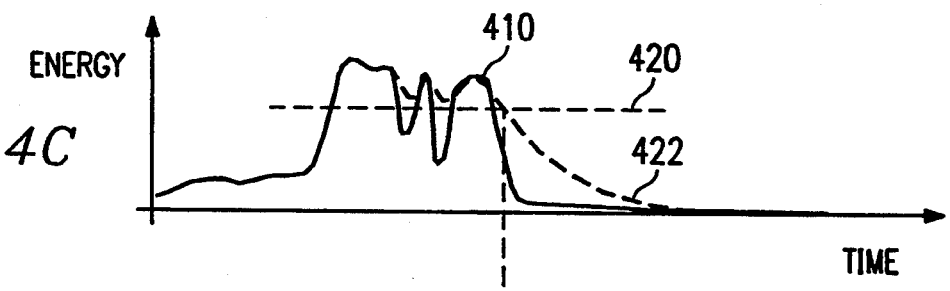
FIG. 4c is a timing diagram of the energy of the audio signal of FIG. 4a within the selected subband.
Figure 4D:
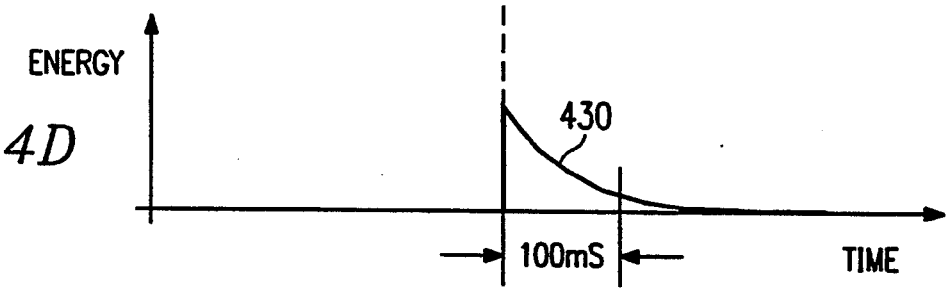
FIG. 4d is a timing diagram of the energy of an encoded data signal to be transmitted with and masked by the audio signal of FIG. 4a within the selected subband.
Figure 4E:
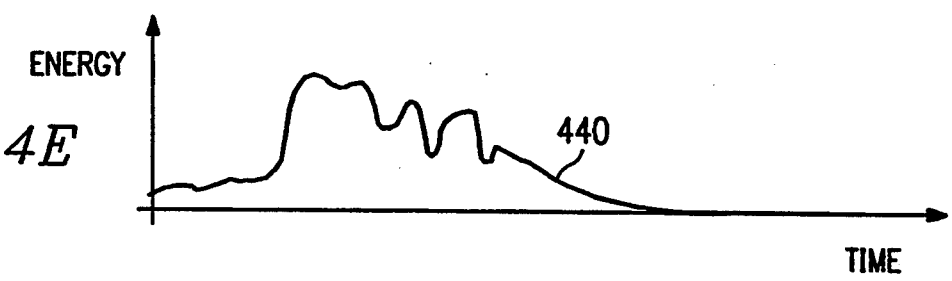
FIG. 4e is a timing diagram of a composite signal within the selected subband comprising the audio signal of FIG. 4a and the data signal of FIG. 4d.

FIGS. 4a–4e illustrate various frequency and timing diagrams of exemplary data and audio signals used and/or produced by the system of the present invention. FIG. 4a illustrates the energy of an audio signal 400, such as that which might be received at the audio in terminal 206a, with respect to frequency. FIG. 4b is a timing diagram of the voltage of a portion 410 of the audio signal 400 within a selected subband 402 (FIG. 4a). FIG. 4c is a timing diagram of the energy of the audio signal portion 410 within the subband 402. Also shown in FIG. 4c is a time masking threshold 420 of the audio signal portion 410, as well as the perceptual entropy envelope 422 thereof, it being understood that the audio signal portion 410 will mask signals having signal energy below its perceptual entropy envelope 422. FIG. 4d illustrates a data signal 430, such as that which might be encoded by the encoder 202, to be transmitted with and masked by the audio signal portion 410. It should be noted that the data signal 430 occurs as a burst signal which undergoes exponential decay for 100 ms. FIG. 4e is a timing diagram of a composite signal 440, such as that which might be output from the encoder 202 via the audio out terminal 206b, comprising the audio signal portion 410 and the data signal 430.

In operation, it is anticipated that the above-described invention may be advantageously used for several purposes, which include, but are not limited to, television and radio surveys and music royalty tracking. For example, in television and radio survey applications, the audio signal at the terminal 206a comprises programming signals and the data signal comprises ID codes for identifying the local station, the broadcaster, the distributor, and others, as well as codes for identifying certain programming and advertisements, may be encoded, as described above, transmitted with the television or radio audio signal, and received at an encoder located in a television viewer or radio listeners home or at some central location. The decoded ID code(s) may then be used to determine the size of the audience for a particular program or time slot at any given time. In a music royalty tracking application, it is envisioned that encoded ID numbers be recorded on CDs such that when the CD is played, the data signal containing the ID code identifying the music programming is transmitted with the audio signal recorded thereon. Again, the encoded data signal may be received and decoded at various strategically located decoding locations having a decoder 300. Typically, this technique will be used to collect data for collecting royalties for computing ratings, such as the "Billboard Top 100".

It is understood that the present invention can take many forms and embodiments. The embodiments shown herein are intended to illustrate rather than to limit the invention, it being appreciated that variations may be made without departing from the spirit of the scope of the invention. For example, the encoder 200 may comprise fewer than all of the transmission encoders 220–224, especially if it is known prior to transmission of the data signal that the data signal will or will not have withstand lossy compression. In addition, the functions of any of the transmission encoders 220, 222, 224, as well as those of the receiver sync circuit 314, and the decoder circuit 328/FSK decoder 314 combination may be performed by digital signal processors, if desired.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. Apparatus for encoding a data signal to be transmitted simultaneously with an audio signal such that said encoded data signal is masked by said audio signal, the apparatus comprising:
   means for monitoring said audio signal to determine a perceptual entropy envelope thereof, said monitoring means generating control signals indicative of said determined perceptual entropy envelope;
   means responsive to said control signals for encoding said data signal as an frequency shift key (FSK) modulated signal and for outputting said FSK modulated signal at times, frequencies and levels falling within said determined perceptual entropy envelope of said audio signal such that when combined with said audio signal, said FSK modulated signal is masked by said audio signal; and
   means for combining said audio signal with said FSK modulated signal to form a composite signal.

2. The apparatus of claim 1 further comprising means responsive to said control signals for encoding said data signal as a spread spectrum signal and for outputting said spread spectrum signal at times, frequencies and levels falling within said detected perceptual entropy envelope of said audio signal such that when combined with said audio signal, said transmitted spread spectrum signal is masked by said audio signal, wherein said means for combining further combines said spread spectrum signal with said FSK modulated signal and said audio signal.

3. The apparatus of claim 2 wherein said spread spectrum encoding means comprises:
   means for merging said data signal modulo-2 with a pseudo noise (PN) code; and
   means for adding a PN header signal to each frame of said data signal.

4. The apparatus of claim 1 wherein said monitoring means comprises an artificial neural network.

5. The apparatus of claim 4 wherein said monitoring means further comprises:
   a clock control circuit connected to an first output of said neural network for generating control signals to control the transmission frequency of said encoded data signal;
   a level control circuit connected to an second output of said neural network for generating control signals to control the level of said encoded data signal; and
   a burst timing circuit connected to an third output of said neural network for generating control signals to control the timing of transmission of said encoded data signal.

6. The apparatus of claim 1 wherein said monitoring means comprises means for determining the perceptual entropy envelope of said audio signal only in a first group of subbands, wherein each subband in said first group of subbands is proximate to a selected subband, said determining means generating control signals to said FSK modulating means for causing said FSK modulating means to output said FSK modulated signal in said selected subband such that it is masked by said audio signal in at least one subband in said first group of subbands and such that it is the strongest signal in said selected subband.

7. The apparatus of claim 1 wherein said data signal contains information for identifying at least one of a broadcaster, a program, a network, or an advertiser.

8. The apparatus of claim 1 further comprising:
   means for generating said data signal;
   means connected to receive said data signal from said generating means for encoding said data signal to withstand error hits during transmission using bit interleaving and block encoding techniques and for supplying said data signal to said FSK encoding means.

9. The apparatus of claim 1 further comprising means for transmitting said composite signal via an audio channel.

10. The apparatus of claim 1 further comprising means for recording said composite signal on a data storage medium.

11. Apparatus for encoding a data signal to be transmitted simultaneously with an audio signal such that said data signal is masked by said audio signal, the apparatus comprising:
    means for monitoring said audio signal to determine a perceptual entropy envelope thereof, said monitoring means generating control signals indicative of said determined perceptual entropy envelope;

means responsive to said control signals for encoding said data signal as a spread spectrum signal and for outputting said spread spectrum signal at times, frequencies and levels falling within said determined perceptual entropy envelope of said audio signal such that when combined with said audio signal, said spread spectrum signal is masked by said audio signal; and means for combining said audio signal with said spread spectrum signal to form a composite signal.

12. The apparatus of claim 11 wherein said encoding means comprises:

means for merging said data signal modulo-2 with a pseudo noise (PN) code; and means for adding a PN header signal to each frame of said data signal.

13. The apparatus of claim 11 further comprising means responsive to said control signals for frequency shift key (FSK) modulating said data signal and for outputting said FSK modulated signal at times, frequencies and levels falling within said detected perceptual entropy envelope of said audio signal such that when combined with said audio signal, said FSK modulated signal is masked by said audio signal, wherein said means for combining further combines said spread spectrum signal with said spread spectrum signal and said audio signal.

14. The apparatus of claim 11 wherein said monitoring means comprises an artificial neural network.

15. The apparatus of claim 14 wherein said monitoring means further comprises:

a clock control circuit connected to an first output of said neural network for generating control signals to control the transmission frequency and processing gain of said spread spectrum signal;

a level control circuit connected to an second output of said neural network for generating control signals to control the level of said spread spectrum signal; and a burst timing circuit connected to an third output of said neural network for generating control signals to control the timing of transmission of said spread spectrum signal.

16. The apparatus of claim 11 further comprising:
means for generating said data signal;
means connected to receive said data signal from said generating means for encoding said data signal to withstand error hits during transmission using block encoding and bit interleaving techniques and for supplying said data signal to said FSK modulation means.

17. The apparatus of claim 11 wherein said data signal contains information for identifying at least one of a broadcaster, a program, a network, or an advertiser.

18. Apparatus for decoding a data signal containing an information code transmitted simultaneously with an audio signal such that said data signal is masked by said audio signal, wherein prior to transmission, said data signal is encoded as frequency shift key (FSK) modulated signal, a direct sequence spread spectrum (DSSS) signal or both, said encoded data signal being combined with said audio signal to form a composite signal, the apparatus comprising:

means for receiving said composite signal from an audio channel;

means connected to said receiving means for filtering said received composite signal, wherein passband parameters of said filtering means are dictated by the bandwidth of said audio channel;

means connected to an output of said filtering means for demodulating said FSK modulated signal if said encoded data signal comprises an FSK modulated signal; and means connected to said filtering means output for decoding said DSSS signal if said encoded data signal comprises a DSSS signal.

19. The decoder of claim 18 wherein said encoded data signal is transmitted in a partial response mode and first and second fuzzy logic forms of said data signal are output from said FSK demodulating means and said DSSS decoding means, respectively, the decoder further comprising means connected to an output of said FSK demodulating means and to an output of said DSSS decoding means for recovering said information code from said first and second fuzzy logic data signals using pattern recognition techniques.

20. The apparatus of claim 18 wherein said means for decoding said DSSS signal comprises:

means for synchronizing the phase of a clock signal with the phase of said DSSS signal and for outputting said synchronized clock signal; and means connected to receive said synchronized clock signal for merging said DSSS signal modulo-2 with a pseudo-noise (PN) code used to encode the data signal.

21. The apparatus of claim 18 further comprising a data storage unit connected to an output of said FSK demodulating means and to an output of said DSSS decoding means.

22. The apparatus of claim 19 further comprising a data storage unit connected to an output of said recovering means for temporarily storing said recovered information code.

23. The apparatus of claim 19 wherein said recovering means comprises an artificial neural network.

24. A communications system for enabling the simultaneous transmission of a data signal and an audio signal via an audio channel such that said data signal is masked by said audio signal, the system comprising:

means for monitoring said audio signal to determine a perceptual entropy envelope thereof, said monitoring means generating control signals indicative of said determined perceptual entropy envelope;

means responsive to said control signals for encoding said data signal as an frequency shift key (FSK) modulated signal and for outputting said FSK modulated signal at times, frequencies and levels falling within said determined perceptual entropy envelope of said audio signal such that when combined with said audio signal, said FSK modulated signal is masked by said audio signal;

means responsive to said control signals for encoding said data signal as a spread spectrum signal and for outputting said spread spectrum signal at times, frequencies and levels falling within said determined perceptual entropy envelope of said audio signal such that when combined with said audio signal, said spread spectrum signal is masked by said audio signal;

means for combining said audio signal, said FSK modulated signal and said spread spectrum signal to form a composite signal;

means for transmitting said composite signal via said audio channel;

means for receiving said transmitted composite signal from said audio channel;

means connected to said receiving means for demodulating said FSK modulated signal of said received composite signal;

means connected to said receiving means for decoding said spread spectrum signal of said received composite signal; and means connected to an output of said demodulating means and to an output of said decoding means for recovering an information code from said demodulated FSK signal and said decoded spread spectrum signal using pattern recognition techniques.

25. The system of claim 24 wherein said encoded data signal is transmitted in a partial response mode, such that said FSK demodulating means and said DSSS decoding means output first and second fuzzy logic forms of said data signal, respectively, the system further comprising means connected to outputs of said FSK demodulating means and said DSSS decoding means for recovering said information code from said first and second fuzzy logic data signals using pattern recognition techniques.

26. The system of claim 24 further comprising means connected to said receiving means for filtering said received composite signal, wherein the passband parameters of said filtering means are dictated by the bandwidth of said audio channel.

27. The system of claim 24 wherein said monitoring means comprises an artificial neural network.

28. The system of claim 27 wherein said monitoring means further comprises:
a clock control circuit connected to an first output of said neural network for generating control signals to control the transmission frequency and processing gain of said FSK modulated signal and said spread spectrum signal;
a level control circuit connected to an second output of said neural network for generating control signals to control the level of said FSK modulated signal and said spread spectrum signal; and
a burst timing circuit connected to an third output of said neural network for generating control signals to control the timing of transmission of said FSK modulated signal and said spread spectrum signal.

29. The system of claim 24 wherein said monitoring means comprises means for determining the perceptual entropy envelope of said audio signal only in a first group of subbands, wherein each subband in said first group of subbands is proximate to a selected subband, said determining means generating control signals to said FSK modulating means for causing said FSK modulating means to output said FSK modulated signal in said selected subband such that it is masked by said audio signal in at least one subband in said first group of subbands and such that it is the strongest signal in said selected subband.

30. The system of claim 24 further comprising:
means for generating said data signal;
means connected to receive said data signal from said generating means for encoding said data signal to withstand error hits during transmission using bit interleaving and block encoding techniques and for supplying said data signal to said FSK encoding means.

31. The system of claim 24 wherein said spread spectrum encoding means comprises:

means for merging said data signal modulo-2 with a pseudo noise (PN) code; and
means for adding a PN header signal to each frame of said data signal.

32. The system of claim 24 wherein said means for decoding said DSSS signal comprises:
means for synchronizing the phase of a clock signal with the phase of said DSSS signal and for outputting said synchronized clock signal; and
means connected to receive said synchronized clock signal for merging said DSSS signal modulo-2 with said pseudo-noise (PN) code.

33. The system of claim 24 wherein said recovering means comprises an artificial neural network.

34. The system of claim 24 further comprising a data storage unit connected to an output of said recovering means for temporarily storing said information code.

35. The system of claim 24 wherein said data signal contains information for identifying at least one of a broadcaster, a program, a network, or an advertiser.

36. A method of encoding a data signal to be transmitted simultaneously with an audio signal such that said encoded data signal is masked by said audio signal, the method comprising:
monitoring said audio signal to determine a perceptual entropy envelope thereof;
generating control signals indicative of said determined perceptual entropy envelope;
responsive to said control signals, encoding said data signal as an frequency shift key (FSK) modulated signal;
outputting said FSK modulated signal at times, frequencies and levels falling within said determined perceptual entropy envelope of said audio signal such that when combined with said audio signal, said FSK modulated signal is masked by said audio signal; and
combining said audio signal with said FSK modulated signal to form a composite signal.

37. The method of claim 36 further comprising:
responsive to said control signals, encoding said data signal as a spread spectrum signal; and
outputting said spread spectrum signal at times, frequencies and levels falling within said determined perceptual entropy envelope of said audio signal such that when combined with said audio signal, said spread spectrum signal is masked by said audio signal;
wherein said combining further comprises combining said spread spectrum signal with said FSK modulated signal and said audio signal.

38. The method of claim 37 wherein said spread spectrum encoding comprises:
merging said data signal modulo-2 with a pseudo noise (PN) code; and
adding a PN header signal to each frame of said data signal.

39. The method of claim 36 wherein said generating comprises:
generating control signals to control the transmission frequency of said encoded data signal;
generating control signals to control the level of said encoded data signal; and
generating control signals to control the timing of transmission of said encoded data signal.

40. The method of claim 36 wherein said monitoring further comprises:

determining the perceptual entropy envelope of said audio signal only in a first group of subbands, wherein each subband in said first group of subbands is proximate to a selected subband; and generating control signals to said FSK modulating means for causing said FSK modulating means to output said FSK modulated signal in said selected subband such that it is masked by said audio signal in at least one subband in said first group of subbands and such that it is the strongest signal in said selected subband.

41. The method of claim 36 further comprising: generating said data signal;
encoding said data signal to withstand error hits during transmission using bit interleaving and block encoding techniques prior to said FSK encoding.

42. The method of claim 36 further comprising transmitting said composite signal via an audio channel.

43. The method of claim 36 further comprising recording said composite signal on a data storage medium.

44. The method of claim 36 wherein said monitoring is performed by an artificial neural network.

45. The method of claim 36 wherein said data signal contains information for identifying at least one of a broadcaster, a program, a network, or an advertiser.

46. A method of encoding a data signal to be transmitted simultaneously with an audio signal such that said data signal is masked by said audio signal, the method comprising:
monitoring said audio signal to determine a perceptual entropy envelope thereof;
responsive to said monitoring, generating control signals indicative of said determined perceptual entropy envelope;
responsive to said control signals, encoding said data signal as a spread spectrum signal;
outputting said spread spectrum signal at times, frequencies and levels falling within said determined perceptual entropy envelope of said audio signal such that when combined with said audio signal, said spread spectrum signal is masked by said audio signal; and
combining said audio signal with said spread spectrum signal to form a composite signal.

47. The method of claim 46 wherein said encoding comprises:
merging said data signal modulo-2 with a pseudo noise (PN) code; and
adding a PN header signal to each frame of said data signal.

48. The method of claim 46 further comprising, responsive to said control signals, frequency shift key (FSK) modulating said data signal and for outputting said FSK modulated signal at times, frequencies and levels falling within said determined perceptual entropy envelope of said audio signal such that when combined with said audio signal, said FSK modulated signal is masked by said audio signal, wherein said means for combining further combines said spread spectrum signal with said spread spectrum signal and said audio signal.

49. The method of claim 43 wherein said monitoring further comprises:
generating control signals to control the transmission frequency and processing gain of said spread spectrum signal;
generating control signals to control the level of said spread spectrum signal; and
generating control signals to control the timing of transmission of said spread spectrum signal.

50. A method of decoding a data signal containing an information code transmitted simultaneously with an audio signal such that said data signal is masked by said audio signal, wherein prior to transmission, said data signal is encoded as frequency shift key (FSK) modulated signal, a direct sequence spread spectrum (DSSS) signal or both, said encoded data signal being combined with said audio signal to form a composite signal, the method comprising:
receiving said composite signal from an audio channel;
filtering said received composite signal, wherein passband parameters of said filtering are dictated by the bandwidth of said audio channel;
demodulating said FSK modulated signal if said encoded data signal comprises an FSK modulated signal; and
decoding said DSSS signal if said encoded data signal comprises a DSSS signal.

51. The method of claim 50 wherein said encoded data signal is transmitted in partial response mode, said FSK demodulating and said DSSS decoding produce first and second fuzzy logic forms of said data signal, respectively, the method further comprising recovering said information code from said first and second fuzzy logic data signals using pattern recognition techniques.

52. The method of claim 50 further comprising temporarily storing said recovered information code.

53. The method of claim 50 wherein said decoding said DSSS signal comprises:
synchronizing the phase of a clock signal with the phase of said DSSS signal and outputting said synchronized clock signal; and
merging said DSSS signal modulo-2 with a pseudo-noise (PN) code used to encode the data signal.

54. A method of enabling the simultaneous transmission of a data signal and an audio signal via an audio channel such that said data signal is masked by said audio signal, the method comprising:
monitoring said audio signal to determine a perceptual entropy envelope thereof, said monitoring means generating control signals indicative of said determined perceptual entropy envelope;
responsive to said control signals, encoding said data signal as an frequency shift key (FSK) modulated signal and outputting said FSK modulated signal at times, frequencies and levels falling within said determined perceptual entropy envelope of said audio signal such that when combined with said audio signal, said FSK modulated signal is masked by said audio signal;
responsive to said control signals, encoding said data signal as a spread spectrum signal and outputting said spread spectrum signal at times, frequencies and levels falling within said determined perceptual entropy envelope of said audio signal such that when combined with said audio signal, said spread spectrum signal is masked by said audio signal;
combining said audio signal, said FSK modulated signal and said spread spectrum signal to form a composite signal;
transmitting said composite signal via said audio channel;
receiving said transmitted composite signal from said audio channel;

demodulating said FSK modulated signal of said received composite signal;

decoding said spread spectrum signal of said received composite signal; and recovering an information code from said demodulated FSK modulated signal and said decoded spread spectrum signal using pattern recognition techniques.

55. The method of claim 54 further comprising filtering said received composite signal, wherein passband parameters of said filtering are dictated by the bandwidth of said audio channel.

56. The method of claim 54 wherein said spread spectrum encoding comprises:

merging said data signal modulo-2 with a pseudo noise (PN) code; and adding a PN header signal to each frame of said data signal.

57. The system of claim 54 wherein said monitoring further comprises:

determining the perceptual entropy envelope of said audio signal only in a first group of subbands, wherein each subband in said first group of subbands is proximate to a selected subband; and responsive to said determining, generating control signals to said FSK modulating means for causing said FSK modulating means to output said FSK modulated signal in said selected subband such that it is masked by said audio signal in at least one subband in said first group of subbands and such that it is the strongest signal in said selected subband.

58. The method of claim 54 further comprising temporarily storing said information code.

59. The system of claim 54 wherein said decoding said spread spectrum signal comprises:

synchronizing the phase of a clock signal with the phase of said spread spectrum signal and outputting said synchronized clock signal; and merging said DSSS signal modulo-2 with said pseudo-noise (PN) code.

* * * * *